United States Patent
Hwang et al.

[11] Patent Number: 5,825,726
[45] Date of Patent: Oct. 20, 1998

[54] MULTI-SESSION DISC AND A HIGH-SPEED ACCESS METHOD THERETO

[75] Inventors: In-Wook Hwang; Jeong-Ho Park, both of Suwon, Rep. of Korea

[73] Assignee: Samsung Electronics Co., Ltd., Kyungki-Do, Rep. of Korea

[21] Appl. No.: 723,566

[22] Filed: Sep. 30, 1996

[30] Foreign Application Priority Data

Sep. 30, 1995 [KR] Rep. of Korea ............... 33231/1995

[51] Int. Cl.⁶ .......................................... G11B 7/00
[52] U.S. Cl. .......................................... 369/32; 369/275.3
[58] Field of Search .................. 369/275.1–275.4, 369/32, 54, 47, 58

[56] References Cited

U.S. PATENT DOCUMENTS

| | | | |
|---|---|---|---|
| 5,132,853 | 7/1992 | Kulakowski et al. | 369/59 |
| 5,341,356 | 8/1994 | Dieleman et al. | 369/58 |
| 5,351,132 | 9/1994 | Sawabe et al. | 369/48 |
| 5,351,226 | 9/1994 | Mizumoto et al. | 369/58 |

*Primary Examiner*—Nabil Hindi
*Attorney, Agent, or Firm*—Sughrue, Mion, Zinn, Macpeak & Seas, PLLC

[57] ABSTRACT

A method for recording and reproducing a multi-session compact disc (CD) which allots a total TOC (TTOC) information storage area, including position information of respective sessions, to a specific area of the CD which enables high-speed access to data recorded on the CD. The disc recorded according to a multi-session mode recording operation includes a PMA area, a plurality of sessions respectively consisting of a lead-in area (LIN), a program area (PGM) and a lead-out area (LOT), and a total TOC area TTOC at the outermost circumferential area of the disc. A total TOC information storage area is allotted to the outermost circumferential area of the disc and the TOCs of respective sessions are recorded in the total TOC TTOC information storage area when recording is finished. High speed access to data recorded on the disc is performed by reading out position information from the total TOC area of the respective sessions.

11 Claims, 5 Drawing Sheets

| LIN1 | PGM1 | LOT1 | LIN2 | PGM2 | LOT2 |

*Fig. 4*

LIN1

0:2:0  TRACK 1

10:0:0  TRACK 2

20:0:0  TRACK 3
LOT1
LIN2
30:0:0  TRACK 1

35:0:0  TRACK 2
LOT2

TOC

| session | TRACK | START ADDRESS |
|---|---|---|
|   | 1 | 0:2:0 |
| 1 | 2 | 10:0:0 |
|   | 3 | 20:0:0 |
| 2 | 1 | 25:0:0 |
|   | 2 | 30:0:0 |

*Fig. 5*

MULTI-SESSION DISC AND A HIGH-SPEED ACCESS METHOD THERETO

BACKGROUND OF THE INVENTION

1. Field of the Invention

The present invention relates to a multi-session disc and an access method therefor, and more particularly to a method for recording on and reproducing from a multi-session disc enabling high-speed access thereto, and the disc relating thereto.

The present application for a multi-session disc and a high-speed access method therefor, is based on Korean Application No. 33231/1995 which is incorporated herein by reference for all purposes.

2. Description of the Related Art

A compact disc (hereinafter referred to as a "CD") generally refers to a disc which records data only once and can reproduce the data many times. A system for recording the data onto the CD is known as a compact recordable system (hereinafter referred to as a CD-R) which is produced by incorporating a CD recorder into a personal computer.

The CD as a recording medium is recorded with data which can have many types of formats. Major recordable formats for the CD-R include a compact disc-digital audio format (CD-DA), a compact disc read-only memory format (CD-ROM), a compact disc-interactive (CD-I) and a CD-ROM extended architecture, in which these recording formats are used in various application environments and applicable formats based on the application capacity of the associated software. The CD-DA format was initially used as the format in audio systems, in a single-session multi-track system recording method. In such a recording method recording is limited to a maximum of 99 tracks, which has been the maximum number of recordable tracks until a multi-session multi-track recording method was attained after the advent of a photo CD by KODAK, Co.

FIG.1 is a block diagram of a typical CD-R system. Here, a disc can be mounted in a record/playback unit 111 for recording/reproducing data on/from the disc and includes a mechanical unit such as a pickup, capable of recording/reproducing data on/from the disc. Record/playback unit 111 detects from an inner lead-in area a start address in a program area of the succeeding tract or session, and transfers the optical pickup to detect a signal from the program area. A data processing unit 112 encodes the data to be recorded in a data format according to a recording pattern, and supplies the encoded data to record/playback unit 111. In addition, data processing unit 112 decodes playback data from record/playback unit 111 to place it in its original data format, thereby providing decoded data.

A memory unit 114, which is a main storage device for the CD-R, may be installed either inside or outside the system. Memory unit 114 temporarily stores the data to be recorded and temporarily stores the reproduced data, and can be a hard disc mounted to the computer. A system controller 113 controls the overall operation of the CD-R and stores a program for carrying out the overall operation of the CD-R. System controller 113 accesses the data in memory unit 114 which is to be recorded in order to supply it to data processing unit 112 when in a record mode and when in a playback mode temporarily stores the reproduced data from data processing unit 112 in memory unit 114.

FIG. 2 illustrates a layout of a CD recorded according to the single-session recording method, which is classified in three areas, namely, a lead-in area LIN, a program area PGM and a lead-out area LOT.

FIG. 3 illustrates a table of contents (TOC) which includes position information for the data recorded in the single-session CD which is divided into the areas shown in FIG. 2.

FIG. 4 illustrates a layout of a CD recorded according to the multi-session recording method. The multi-session layout consists of a plurality of sessions each having a lead-in area, program area, and lead-out area which are recorded on the CD.

FIG. 5 illustrates the TOC which includes the position information for the data recorded in the multi-session CD, classified in the areas shown in FIG. 4.

FIG. 6 shows a structure of the disc when the multi-session recording method is utilized with a conventional CD.

In view of the conventional recording method, with reference to the above-described structures, software is installed in system controller 113 in accordance with the recording format of the CD as shown in FIG. 1, and data is recorded by employing various disc formats desired by a user such as the CD-DA, CD-ROM, CD-I and CD-ROM/XA formats. When actually recording data onto the CD, either the single-session or multi-session recording methods can be selected, in which the multi-session recording method records with a plurality of sessions, in which a session, or volume, consists of a lead-in area, a data area and a lead-out area. For example, if an audio compact disc is structured to have one lead-in area and one lead-out area and has five music programs in the program area, the disc is structured as a single-session multi-track disc (i.e., a single session with five tracks).

The additional recording of multiple tracks per session in the above two recording patterns, becomes possible in accordance with the application environment of the software. However, despite the recording method adopted, the maximum number of recordable tracks is limited to 99 tracks, in which a track corresponds to a program, such as a music program, recorded in the program area.

A program test area PMA is an area for temporarily storing TOC information for the track recorded just before finalizing the CD by executing the additional recording, which can be utilized a maximum of 99 times. Here, "finalizing the CD" denotes recording information on the disc which inhibits further recording after the data recording on the CD is completed in the CD-R. Therefore, after completing recording of up to the 99th track, the CD-R performs the step of finalizing the CD to move the entire data from the PMA area and store it in the lead-in area LIN, thereby finishing the recording.

A lead-in area LIN is an area for storing various information regarding the data stored in a program area PGM after completing the recording, and which stores the TOC information stored in the PMA area when the record mode is executed after finalizing the CD. The TOC information indicates position information or the information recorded in the program area PGM, which is the area for storing the information in a maximum of 99 tracks.

A lead-out area LOT is an area allotted by the succeeding program area PGM.

Data can be recorded on the CD in either the single-session or multi-session methods as described above. Also, the program area PGM, which is recorded with the actual data, includes at least one track which consists of a perfect file structure or an audio segment capable of being recording once. The lead-in area LIN and the lead-out area LOT are placed before and after, respectively, the program area PGM which is recorded with a data track group, or in other words with several tracks, such as five tracks, within the data area. An index of the entire tracks is recorded at the initial position in the inner circumferential direction of the disc, and such an index is the above-stated TOC. The data is recorded on a maximum of 99 tracks on one plate of the CD. When the multi-track concept is applied to the audio CD, the entire width of the CD is referred to as the track. That is, when the next track is selected by a CD reproducer, the CD reproducer analyzes the position information from the TOC to calculate the starting address of the next track. Then, the pickup is transferred to the corresponding starting address position to reproduce the selected track.

The multi-session CD, as shown in FIG. 4, has a plurality of sessions. Accordingly, the TOC of the multi-session CD has an entry corresponding to the following session in addition to the position information for its own session. Typically, an interval between the tracks in the multi-session CD is 150 physical blocks (0:2:0, i.e., 350 Kbytes). Also, an interval between the first and second sessions is 11,400 physical blocks (0:32:0, i.e., 27 Mbytes), and the intervals between other sessions, except for the interval between the first and second sessions, is 6,800 physical blocks (1:32:0, i.e., 14 Mbytes) in all. The interval between the sessions has a structure which includes the lead-out area of the preceding session and the lead-in area of the succeeding session.

A typical method of recording data on the disc is that of recording according to the single-session multi-track method, as shown in FIG. 3, in a single-session disc format as shown in FIG. 2. In the single-session recording method disc, data is recorded from a physical address of 0:2:0. The second track is recorded after leaving empty 150 physical blocks from the end of the first track. Then, after recording all the tracks, recording termination data is set.

Another method of recording is according to the multi-session multi-track mode which is shown in FIG. 5 for the disc format shown in FIG. 4. In association with the recording of the multi-session disc, a plurality of track data is recorded in respective sessions, and track information for the corresponding session is recorded in the lead-in area LIN of that corresponding session. After an entire track is recorded, until reaching the last session "M" via the foregoing method, recording termination data is recorded in the lead-in area LINM of the finalized session.

When data is recorded on the CD via the multi-session recording method as discussed above, the structure of the CD upon completing the recording thereon has a pattern as shown in FIG. 6. A CD-ROM driver for reproducing the CD recorded in the multi-session format as discussed above, sequentially checks the lead-in area of the CD once the CD is inserted thereto, and confirms the finalized session to execute the playback operation. Typically, when the CD is inserted in the CD reproducer, the CD reproducer first places the optical pickup onto the lead-in area LIN1 of the first session at the innermost circumference of the CD and, by doing so, confirms the starting address of program area PGM2 of the second session. Successively, the pickup is transferred to program area PGM2 of the second session to check whether or not recorded data is present. At this time, if the data is read out in program area PGM2, the pickup is again transferred to the inner circumferential direction of the CD to read out the starting address of program area PGM3 of the succeeding third session at the lead-in area LIN2 position. Then, the pickup is repeatedly moved to the program area PGM3 to check again whether or not data is recorded present. Accordingly, when the CD recorded with the data via the multi-session recording method is reproduced, the CD reproducer checks the status of respective sessions while repeating the above-described operations until reaching the Mth session which is the last session. At this time, if termination CD data is recorded in lead-in area LINM of the Mth session, the pickup is moved to the recorded area to carry out the playback operation.

Therefore, when the CD recorded via the multi-session recording method is reproduced, the conventional apparatus for reproducing data from a multi-session CD should read overall TOC data corresponding to the respective sessions. In such a case, the CD reproducer reads out the session position information as many times as the number of sessions while jumping to respective lead-in areas LIN1–LINM. Here, when there are a large number of sessions and a large amount of data recorded on the CD, the above operation must be repeatedly executed, and according to the performance of the system, this method has the consequence of consuming a large amount of time in order to access the data.

SUMMARY OF THE INVENTION

It is an object of the present invention to provide a disc structure for allotting a total TOC information storage area including position information of the sessions to a specific area position on a CD, thereby enabling high speed access by an apparatus for reproducing the CD which is recorded with a multi-session system.

It is another object of the present invention to provide a method capable of allotting a total TOC information storage area to the outermost circumferential area of a disc and recording the TOC of respective sessions in the total TOC information storage area when finishing recording in a system for recording/reproducing a CD recorded with a multi-session system.

It is still another object of the present invention to provide a method capable of performing high speed access to data by reading out position information of respective sessions recorded in a total TOC area at the outermost circumferential area of a disc in a system for recording/reproducing a CD recorded with a multi-session system.

To achieve the above object of the present invention, a disc is provided, which is recorded during a record mode operation with information according to a multi-session mode, the disc comprising:

a PMA area located at an inner circumferential area of the disc;

a session area located at an circumferential area of the disc outside of said PMA area, said session area having a plurality of sessions recorded therein, wherein each of said plurality of sessions includes a lead-in area, a program area and a lead-out area, positions of which are set during the record mode operation, wherein information relating to positions of said plurality of sessions is recorded in said PMA area; and a total table of contents (TOC) area located between the lead-out area of an outermost recorded session of said plurality of sessions and the outermost circumferential area of the disc, wherein said position information recorded in the respective lead-in areas of said plurality of sessions is recorded in said total TOC area.

Furthermore, a method for recording data on a disc and reproducing data from the disc according to a multi-session mode, is provided, wherein the disc includes a total table of contents (TOC) area and a session area having a plurality of sessions in which each session includes a lead-in area, a program area and a lead-out area, the method comprising the steps of:

analyzing an operational mode of the disc;

transferring track position information of the program area of one of the plurality of sessions into a corresponding lead-in area upon finalizing session recording when the operational mode of the disc is determined in said analyzing step to be a multi-session record mode and the disc is not in a finalized state, and accessing the track position information of said one of said plurality of sessions recorded in the corresponding lead-in area when the disc is in a finalized state; and accessing total TOC information recorded in the total TOC area to locate and reproduce selected data when the operational mode of the disc is determined in said analyzing step to be a multi-session playback mode.

BRIEF DESCRIPTION OF THE DRAWINGS

The above objects and other advantages of the present invention will become more apparent by describing in detail preferred embodiments thereof with reference to the attached drawings, in which:

FIG. 4 is a view showing a recording format of a multi-session disc;

FIG. 5 is a view showing a multi-track structure of the multi-session disc having the format shown in FIG. 4;

DETAILED DESCRIPTION OF THE PREFERRED EMBODIMENT

Figure 1:
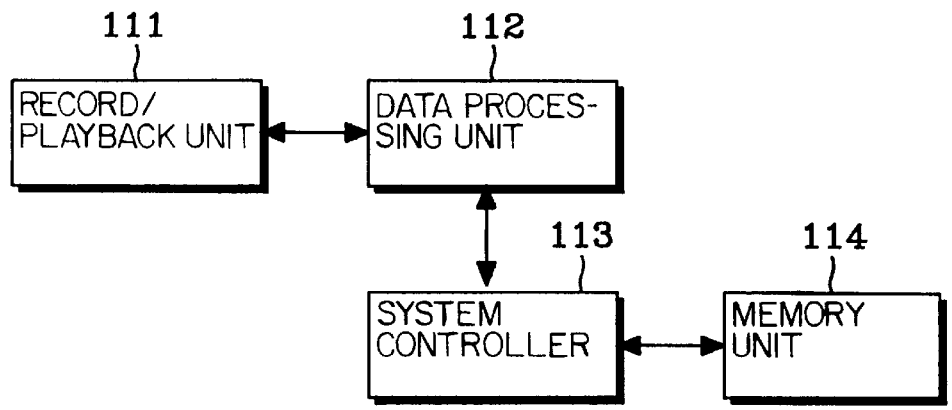
FIG. 1 is a view showing a construction of a compact disc recorder for recording/reproducing data on/from a disc.
Figure 2:
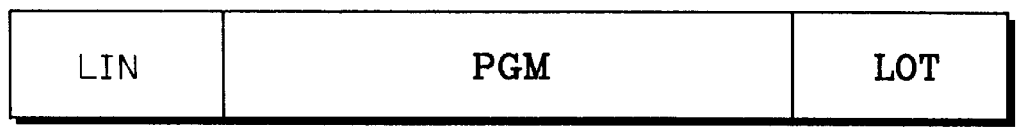
FIG. 2 is a view showing a recording format of a single-session disc.
Figure 3:
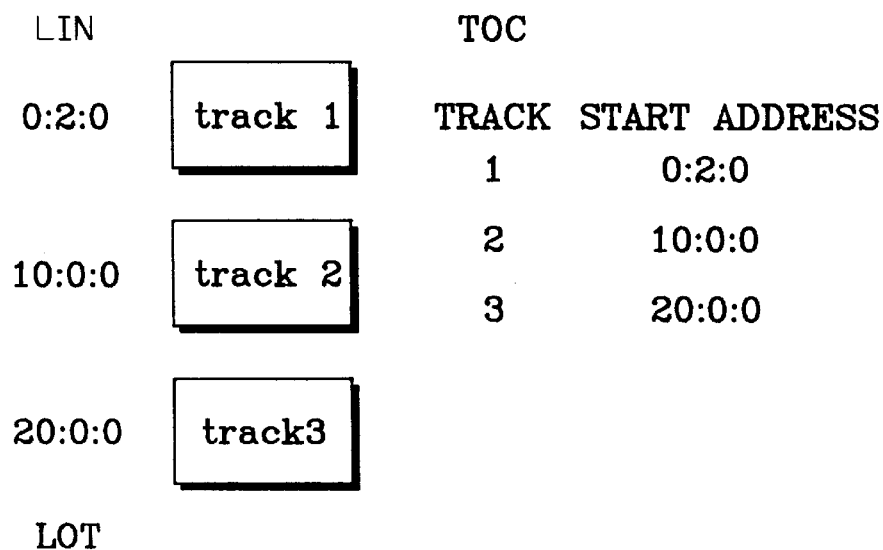
FIG. 3 is a view showing a multi-track structure on the single-session disc having the format shown in FIG. 2.

A preferred embodiment of a multi-session disc and a high-speed access method thereto according to the present invention is described in detail below with reference to the accompanying drawings, in which the same parts are indicated by the same reference numerals.

The phrase "recording termination data" used herein designates finalized CD information which is set when no further data can be recorded onto a CD, since recording of data is finished in a record mode. Accordingly, when recording termination data is recorded the CD can be used only in a playback mode. "Total TOC" denotes information used in the present invention for executing high speed access to the CD data, in which all the TOCs of the respective sessions are stored in a total TOC area which is allotted to the outermost circumferential area of the CD when data recording on the CD via a multi-session recording method is finished.

The structure of a CD-R system for performing an expanded mode recording operation to record data on the CD in conformity with the present invention is identical to that shown in FIG. 1, wherein like reference characters designate like parts. Here, system controller 113 software implements a record mode for storing the total TOC in a total TOC area allotted to the outermost circumferential area of the CD after completing the record mode operation according to the present invention.

Figure 7:
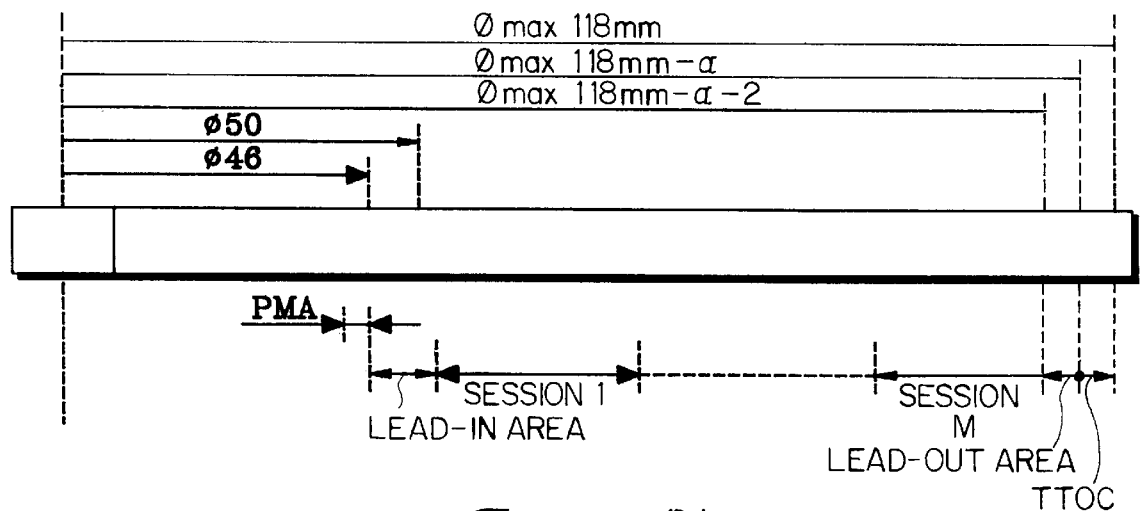
FIG. 7 is a view showing a layout of a CD-R disc according to the present invention.

FIG. 7 shows the layout of the CD upon finishing the record mode operation according to the multi-session recording method of the present invention, in which each of the respective sessions 1~M includes a lead-in area LIN, a program area PGM and a lead-out area LOT. Also, each respective lead-in area LIN is recorded with the TOC for its corresponding session. The total TOC area TTOC stores all the TOCs of the sessions, each of which is respectively stored in lead-in areas LIN1–LINM of the respective sessions.

Generally, a CD is a disc having a large storage capacity of approximately 600 Mbytes, in which space is left after the last lead-out area, rather than recording data on the entire area of the disc, in order to secure a minimum area with respect to the lead-in area and lead-out area between sessions. For this reason, the TOCs of respective sessions are sequentially recorded in the total TOC area which is allotted to the outermost circumferential area of the CD and which is located at a specific position of the lead-out area of the last session when the record mode operation is complete. Also, in the playback mode, the total TOC recorded in total TOC area TTOC is read out in order to reproduce the desired tracks at high speed.

Figure 8A:
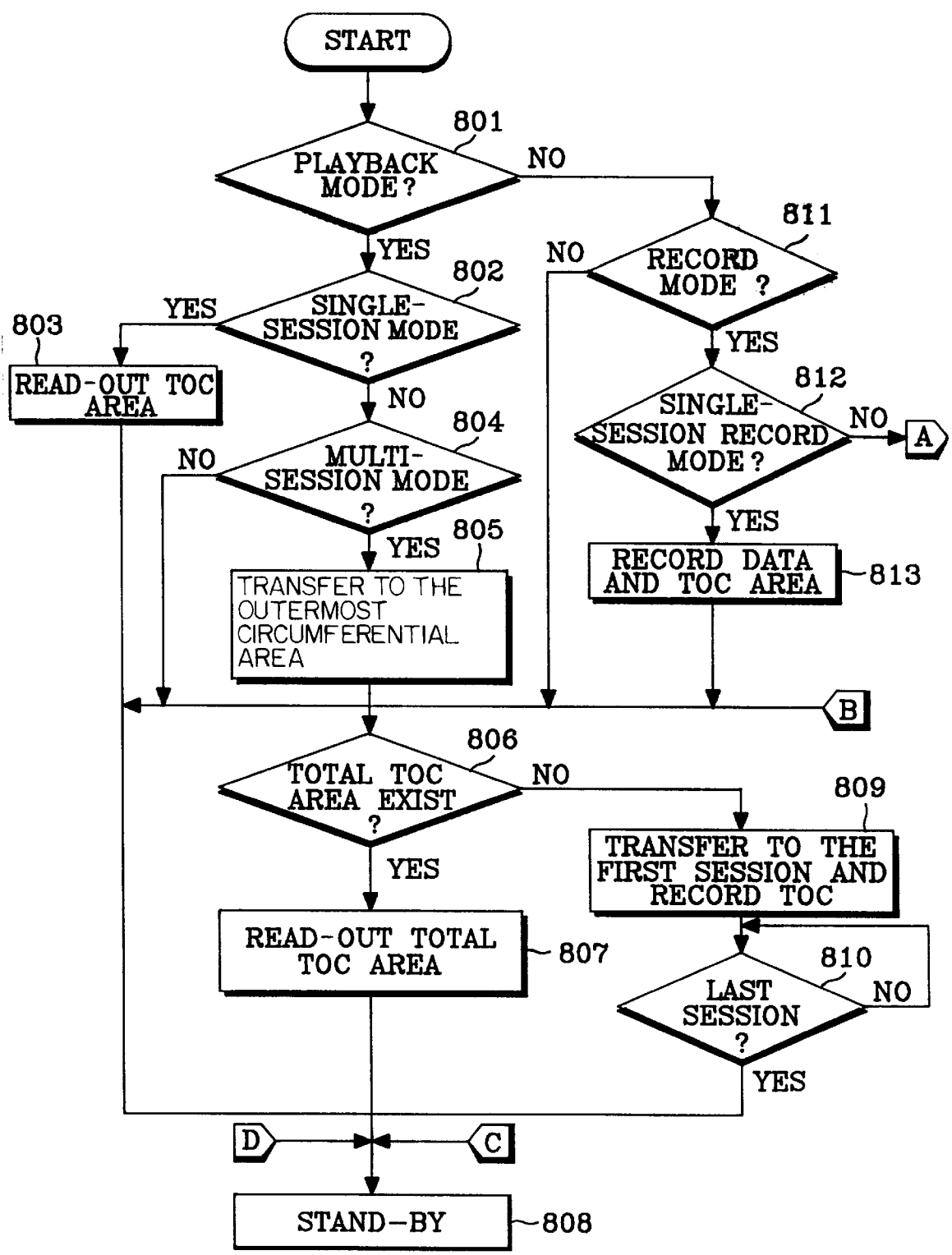
FIGS. 8A and 8B are flowcharts showing a recording/reproducing process for the multi-session disc according to the present invention.
Figure 8B:
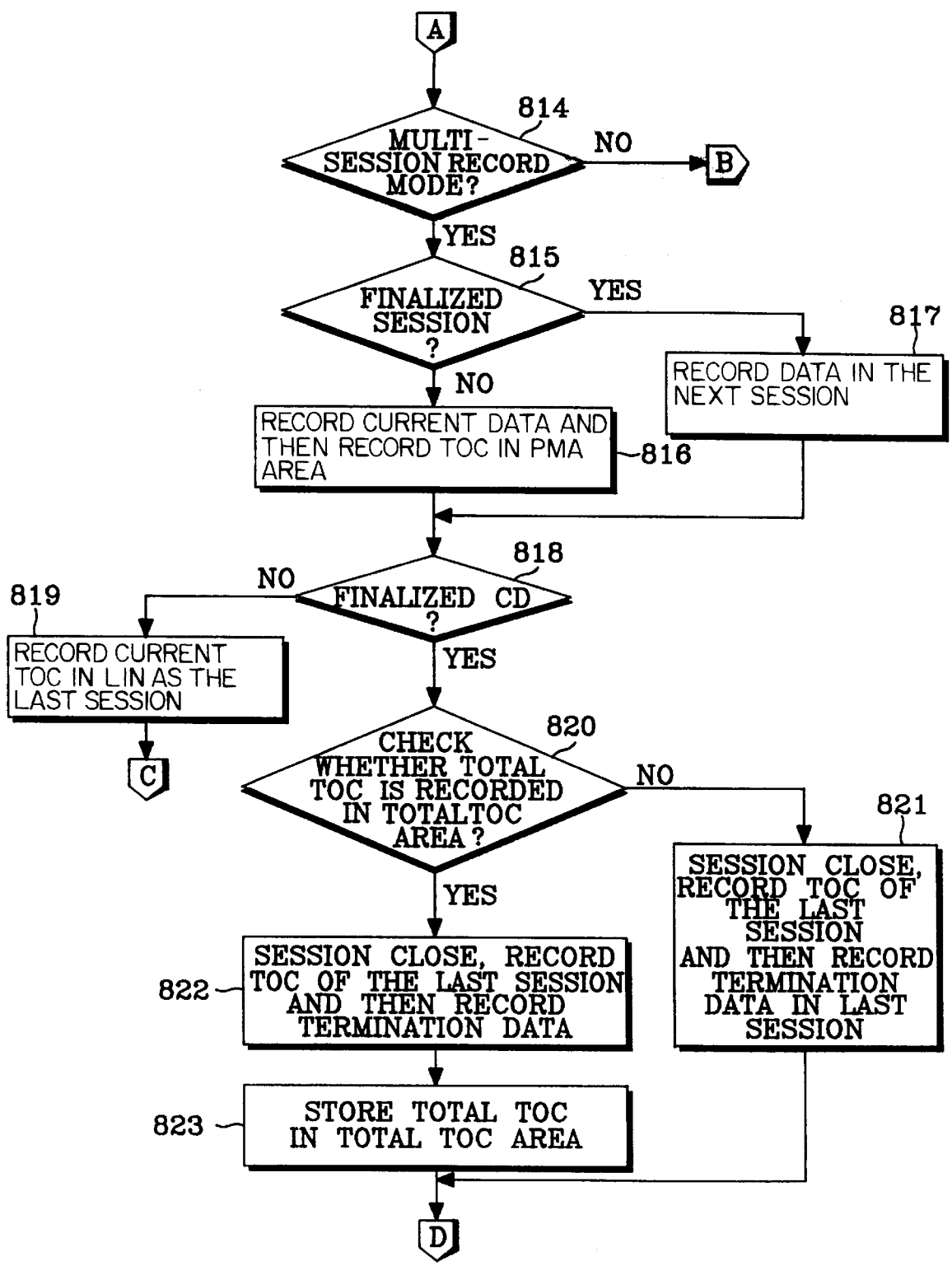

FIGS. 8A and 8B are flowcharts showing the steps for recording data on the disc according to the multi-session recording method of the present invention. Here, in the record mode, data is recorded in program area PGM of a selected session, and the TOC of the corresponding session and the start address of the succeeding session are recorded in lead-in area LIN of the corresponding session when recording of that session is finished. Further, the TOCs recorded in lead-in areas LIN1–LINM of all the sessions are sequentially recorded in the total TOC area TTOC allotted to the outermost circumferential area of the CD, before recording the TOC for the corresponding session and before recording termination data in lead-in area LINM upon completion of recording the last session. In the playback mode, the TOCs of respective sessions, which are recorded in the total TOC area TTOC, are read out to check the starting addresses of respective sessions prior to executing the playback operation.

In the present invention, when data is recorded on the CD according to the multi-session mode, total TOC area TTOC is allotted for recording the total TOC in an area next to the final lead-out area LOTM, to facilitate locating and accessing the recorded at high speed when the TOC is read out in the playback mode after finalizing the session recording and the recording termination data is recorded.

In considering the operation during the record mode and playback mode according to the present invention, the single-session record mode or multi-session record mode is set according to the record mode of the CD-R. Therefore, if the record mode is set, system controller 113 deletes this step 811, as shown in FIG. 8A, and checks in step 812 whether or not the system is in the single-session record mode. If the disc is determined to be in the single-session record mode in step 812, the single-session record mode operation is performed in step 813. Here, the TOC temporarily-recorded in the PMA area is read out during the single-session record mode to move the pickup to the track position of the corresponding program area PGM, to thereby record the data. When recording of the data in program area PGM is finished, an indication of completion thereof is temporarily recorded in the PMA area. If the single-session record mode is intended to be finished, the TOC for the multiple tracks recorded in the PMA area is moved to be stored in the lead-in area LIN. Then, the termination data is recorded.

Thus, when executing the single-session record mode, data for multiple tracks is stored in program area PGM, and the TOC being the position information of the recorded tracks is temporarily recorded in the PMA area while the record mode operation is carried out. Next, when recording for the single-session record mode operation is finished, the TOCs recorded in the PMA area are recorded in lead-in area LIN and, simultaneously, the recording termination data is recorded, thereby finishing the recording operation for the single-session disc.

Thereafter, the program proceeds to a stand-by state at step 808, waiting to be placed in playback mode. In this case, the single-session disc cannot execute any further record mode operations.

However, if it is determined in step 812 that the mode is not the single-session record mode, the system in step 814 checks whether or not the mode is the multi-session record mode. If the mode is not the multi-session record mode, the program enters the stand-by state.

When the mode is determined to be the multi-session recording mode in step 814, steps 815 through 819 are executed to carry out the recording mode for the corresponding session. More specifically, it is checked in step 815 whether or not the session is being finalized, or in other words recording for that session is completed. When the session is not being finalized, data is recorded in program area PGM of the corresponding session and the TOC, being the track position information of the recorded program area PGM, is recorded in the PMA area in step 816. If the session is finalized, data is recorded in step 817 starting from the first track of program area PGM of the succeeding session. When the record mode is stopped, the system checks in step 818 whether or not recording termination data is recorded. Here, if recording is intended to be stopped and the recording of termination data is not to be recorded, the disc is to be left open and the TOC, which includes the position information of the track recorded in the program area of the current session, is recorded in the lead-in area LIN as the last session, in step 819.

Figure 6:
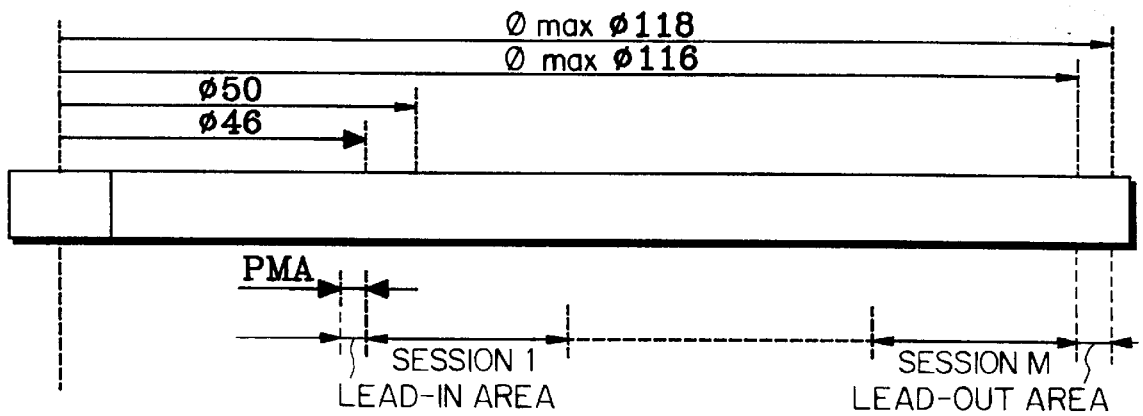
FIG. 6 is a view showing a layout of a conventional CD-R disc.

When data is recorded in respective sessions in the multi-session record mode, the track data is recorded in program area PGMi of session i which is the session being currently recorded. Also, the TOC indicating the position of the track is recorded in the PMA area. After finishing the data recording in session i, the TOC of session i, recorded in PMA area, is moved and stored in the lead-in area LINi, and the data is recorded again from the initial track of program area PGMi+1 of the succeeding session i+1. The TOC for the program area PGMi+1 recorded at this time is also recorded in the PMA area. If the recording operation for the session is stopped while performing the record mode operation for the session, the TOC stored in the current PMA area is moved and stored in lead-in area LIN of the corresponding session regardless of the disc being finalized, thereby making it the last session while the disc is open. Here, the disc being "open" refers to the state of the disc such that data can be recorded on the disc at another time though the record mode has been stopped. However, the stopping of the multi-session record mode in step 818 means that the disc is to be finalized such that recording on the disc is finished and further recording on the disc is not permitted such that the disc can be utilized only for playback. In this case, it is checked in step 820 whether or not the total TOC is recorded in the total TOC area TTOC. If the total TOC is not recorded, the session close operation is carried out in step 821, and the TOC of the last session is read out from the PMA area to record it in the lead-in area of the last session together with the recording termination data. The structure of the CD in this instance has a pattern such that the multiple sessions are sequentially recorded, as shown in FIG. 6, and the sessions each have a lead-in area LIN, a program area PGM and a lead-out area LOT, respectively. Accordingly, the general multi-session recording operation is carried out.

When the total TOC is stored in total TOC area TTOC in step 820, however, the session close operation is executed in step 822, and the TOC of the last session is read out from the PMA area to be recorded in the lead-in area of the last session together with the recording termination data. In step 823, the total TOC is then stored in total TOC area TTOC. Here, the total TOC denotes all the TOCs of the sessions recorded in the lead-in areas of the respective sessions, and the total TOC stored in total TOC area TTOC has the individual TOCs arranged in order from the TOC for the initial session to the TOC for the last session.

Thus, in operating the multi-session record mode, it is determined whether or not the last recorded session is a finalized session prior to performing the recording operation. If the session is not finalized, the corresponding session is regarded as being open, and the track to be recorded next is recorded after the current track. Then, the TOC is recorded in the PMA area upon completion of recording the track data. Whereas, if the session is finalized, the first track of the following session is recorded. When the multi-session record mode operation is completed and the total TOC is recorded after the overall recording, the finalized session and finalized CD information are recorded in the lead-in area of the last session and the total TOC is recorded in total TOC area TTOC, thereby completing the record mode operation. In this case, the structure of the CD has a pattern as shown in FIG. 7. However, when the multi-session record mode operation is simply completed, the finalized session and finalized CD are executed. In the case of temporarily pausing without finalizing the CD, the disc is left open to enable additional recording and the recording operation is finished.

Regarding the playback mode operation, upon system controller 113 sensing the playback mode in step 801, it checks in step 802 whether or not the recorded CD is in a single-session mode. If the CD is in the single session mode, the TOC of lead-in area LIN is read out in step 803 to perform the playback operation.

If the CD is not recorded in the single session mode, system controller 113 checks whether or not the CD is recorded in the multi-session mode. When the CD is being recorded according to the multi-session mode, the pickup is moved to the outermost circumferential area of the CD in step 805. Then, in step 806 it is checked whether or not the total TOC area TTOC exists in the outermost circumferential area of the CD. In other words, it is determined whether or not the structure of the CD has a recorded pattern as shown in FIG. 7. At this time, if total TOC area TTOC exists, the TOC information for the respective sessions recorded in total TOC area TTOC is sequentially read-out in step 807, to thereby reproduce the data of the selected tracks. However, if total TOC area TTOC does not exist, i.e., in case of a CD in the multi-session mode as shown in FIG. 6, steps 809 and 810 are performed to sequentially read out the TOC of respective sessions recorded in lead-in areas LIN1–LINM or the first session to the last session to be stored, and then the data for the selected tracks is reproduced.

As shown in FIG. 7 the TTOC area extends from the maximum diameter of the disc ($\phi$max 118 mm to $\phi$max 118 mm-$\alpha$), where $\alpha$ corresponds to the size of the TTOC area. Also, the last lead-out area (LOTM) extends from $\phi$max 118 mm-α to φmax 118 mm-α-2, and the first lead-in area (LIN1) extends from φ50 to φ46.

As described above, a CD is a disc having a large storage capacity of 600 Mbytes, in which space is left after the last lead-out area rather than the data being recorded on the entire area until reaching the final area of the actual disc because of securing the minimum area with respect to the lead-in area and lead-out area between sessions. For this reason, the TOCs of respective sessions are sequentially recorded in the total TOC area allotted to the outermost circumferential position of the CD which is a specific position of the lead-out area of the last session upon completing the recording mode operation. Also, in the playback mode, the total TOC recorded in total TOC area TTOC is read-out to reproduce the desired tracks at high speed.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A disc recorded during a record mode operation with information according to a multi-session mode, comprising:
   a PMA area located at an inner circumferential area of the disc;
   a session area located at an circumferential area of the disc outside of said PMA area, said session area having a plurality of sessions recorded therein, wherein each of said plurality of sessions includes a lead-in area, a program area and a lead-out area, positions of which are set during the record mode operation, wherein information relating to positions of said plurality of sessions is recorded in said PMA area; and
   a total table of contents (TOC) area located between the lead-out area of an outermost recorded session of said plurality of sessions and the outermost circumferential area of the disc, wherein said position information recorded in the respective lead-in areas of said plurality of sessions is recorded in said total TOC area.

2. The disc as claimed in claim 1, wherein said outermost recorded session is the last session recorded on the disc.

3. The disc as claimed in claim 1, wherein said position information is recorded in sequential order in said total TOC area.

4. A disc recorded during a record mode operation with information, comprising:
   a PMA area located at an inner circumferential area of the disc;
   a session area located at an circumferential area of the disc outside of said PMA area, said session area having a one or more sessions recorded therein, wherein each of said one or more sessions includes a lead-in area, a program area and a lead-out area, positions of which are set during the record mode operation, wherein information relating to positions of the sessions is recorded in said PMA area; and
   a total table of contents (TOC) area located between an outermost point of said session area and the outermost circumferential area of the disc, wherein said position information recorded in the respective lead-in areas of the sessions is recorded in said total TOC area.

5. The disc as claimed in claim 4, wherein said position information is recorded in said total TOC area in the order in which said one or more sessions are recorded in said session area.

6. A method for recording data on a disc and reproducing data from the disc according to a multi-session mode, wherein the disc includes a total table of contents (TOC) area and a session area having a plurality of sessions in which each session includes a lead-in area, a program area and a lead-out area, the method comprising the steps of:
   analyzing an operational mode of the disc;
   transferring track position information of the program area of one of the plurality of sessions into a corresponding lead-in area upon finalizing session recording when the operational mode of the disc is determined in said analyzing step to be a multi-session record mode and the disc is not in a finalized state, and accessing the track position information of said one of said plurality of sessions recorded in the corresponding lead-in area when the disc is in a finalized state; and
   accessing total TOC information recorded in the total TOC area to locate and reproduce selected data when the operational mode of the disc is determined in said analyzing step to be a multi-session playback mode.

7. The method claimed in claim 6, wherein said total TOC area is recorded between the lead-out area of the outermost recorded session of said plurality of sessions and the outermost circumferential area of the disc.

8. The disc as claimed in claim 7, wherein said outermost recorded session is the last session recorded on the disc.

9. A method for recording data on a disc and reproducing data from the disc according to a multi-session mode, wherein the disc includes a total table of contents (TOC) area, a PMA area and a session area having a plurality of sessions stored therein wherein each of the sessions includes a lead-in area, a program area and a lead-out area, the method comprising the steps of:
   analyzing an operational mode of the disc;
   recording track data in the program area of a current one of the plurality of sessions and recording position information of the recorded track data in the PMA area when the operational mode of the disc is determined in said analyzing step to be a multi-session record mode, and transferring the position information of the current session from the PMA area into a lead-in area of the current session and recording the initial track data of the program area of a succeeding session when the current session is finalized;
   determining if information is present in the total TOC area information if the disc is in a finalized state;
   transferring the TOC information of a previously recorded session into the lead-in area of the current session when said information is determined in said determining step not to be present in the total TOC area, and finishing a record mode operation;
   transferring said TOC information of said previously recorded session into the lead-in area of said current session, and accessing position information of one of the plurality of sessions recorded in the lead-in area of said previously recorded session to sequentially record the result in said total TOC area when information is determined in said determining step to be present in the total TOC area, and finishing the record mode operation;
   reading out said total TOC area when said analyzing step determines the operational mode of the disc to be a multi-session playback mode;
   sequentially reading out position information of the plurality of sessions recorded in said lead-in areas of the respective sessions to locate and reproduce said track data in accordance with a selection when no information is determined in said determining step to be present in said total TOC area; and accessing the total TOC information recorded in the total TOC area to locate and reproduce said track data in accordance with the selection when information determined in said determining step to be present in said total TOC area.

10. A method as claimed in claim 9, wherein said total TOC area is recorded between the lead-out area of the outermost session of said plurality of sessions and the outermost circumferential area of the disc.

11. The disc as claimed in claim 10, wherein said outermost session is the last session recorded on the disc.

* * * * *